United States Patent
Lilley

(10) Patent No.: US 7,461,372 B2
(45) Date of Patent: Dec. 2, 2008

(54) SYSTEM FOR OPTIMIZING DISTRIBUTION OF INFORMATION EMPLOYING A UNIVERSAL DICTIONARY

(75) Inventor: Patrick C. Lilley, Irvine, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 560 days.

(21) Appl. No.: 10/681,861

(22) Filed: Oct. 8, 2003

(65) Prior Publication Data

US 2004/0148597 A1 Jul. 29, 2004

Related U.S. Application Data

(60) Provisional application No. 60/418,123, filed on Oct. 11, 2002.

(51) Int. Cl.
*G06F 9/44* (2006.01)
*G06K 9/46* (2006.01)
*G06K 9/60* (2006.01)

(52) U.S. Cl. ............... 717/168; 717/174; 382/236; 382/305; 348/207.1

(58) Field of Classification Search ......... 717/168–178; 725/105, 132, 152; 382/236, 305; 348/207.1
See application file for complete search history.

(56) References Cited

U.S. PATENT DOCUMENTS

| | | | | |
|---|---|---|---|---|
| 4,783,841 A | * | 11/1988 | Crayson | 382/243 |
| 5,261,055 A | | 11/1993 | Moran et al. | 395/275 |
| 5,442,771 A | | 8/1995 | Filepp et al. | 395/650 |
| 5,479,637 A | | 12/1995 | Lisimaque et al. | 395/430 |
| 5,579,522 A | | 11/1996 | Christeson et al. | 395/652 |
| 5,596,738 A | | 1/1997 | Pope | 395/430 |
| 5,598,534 A | | 1/1997 | Haas | 395/200.09 |
| 5,608,910 A | | 3/1997 | Shimakura | 395/670 |
| 5,623,604 A | | 4/1997 | Russell et al. | 395/200.1 |
| 5,666,293 A | | 9/1997 | Metz et al. | 395/200.5 |
| 5,752,039 A | * | 5/1998 | Tanimura | 717/168 |
| 5,778,440 A | | 7/1998 | Yiu et al. | 711/154 |
| 5,790,974 A | | 8/1998 | Tognazzini | 701/204 |
| 5,794,254 A | * | 8/1998 | McClain | 707/204 |
| 5,878,256 A | | 3/1999 | Bealkowski et al. | 395/652 |
| 5,960,189 A | * | 9/1999 | Stupek et al. | 717/169 |

(Continued)

FOREIGN PATENT DOCUMENTS

CA   2339923   3/2000

(Continued)

*Primary Examiner*—Lewis A. Bullock, Jr.
*Assistant Examiner*—Michael Yaary

(57) ABSTRACT

Disclosed herein is a system for optimizing distribution of information employing a universal dictionary. Optimization may include reducing data communicated between a sender and a receiver when both employ the same (or similar) universal dictionary. The universal dictionary may be a reference frame available to the sender as well as the receiver, deviation from which constitutes data that may be communicated to the other party (sender or receiver). Use of the reference image by a flash manager in an electronic device to create a new flash image may reduce the size of any update package to be transferred to an electronic device from a flash image server and may also reduce time to transfer the update package and time taken to update FLASH memory in the electronic device. The reference image in the electronic device may also contain significant portions of the binary image.

28 Claims, 4 Drawing Sheets

U.S. PATENT DOCUMENTS

| | | | |
|---|---|---|---|
| 5,960,445 A | 9/1999 | Tamori et al. | 707/203 |
| 6,009,497 A | 12/1999 | Wells et al. | 711/103 |
| 6,018,747 A * | 1/2000 | Burns et al. | 707/203 |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,683,993 B1 * | 1/2004 | Mead | 382/253 |
| 6,775,423 B2 * | 8/2004 | Kulkarni et al. | 382/305 |
| 6,970,189 B1 * | 11/2005 | Bernstein et al. | 348/211.2 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

* cited by examiner

SYSTEM FOR OPTIMIZING DISTRIBUTION OF INFORMATION EMPLOYING A UNIVERSAL DICTIONARY

CROSS-REFERENCE TO OTHER APPLICATIONS

The present application claims the benefit of U.S. Provisional Application having Ser. No. 60/418,123 filed on Oct. 11, 2002, the complete subject matter of which is hereby incorporated herein by reference in its entirety.

The present application also hereby incorporates herein by reference the complete subject matter of PCT Application having publication number WO 02/41147 A1 and application number PCT/US01/44034, filed Nov. 19, 2001, in its respective entirety.

The present application also hereby incorporates herein by reference the complete subject matter of U.S. Provisional Application having Ser. No. 60/249,606 filed Nov. 17, 2000, in its respective entirety.

The present application also hereby incorporates herein by reference the complete subject matter of U.S. Provisional Application having Ser. No. 60/401,054, filed Aug. 5, 2002, in its entirety.

The Applicant hereby identifies the following patent applications pursuant to 37 C.F.R. §1.78(f)(1):

U.S. patent application Ser. No. 10/646,975 filed Aug. 22, 2003;
U.S. patent application Ser. No. 10/654,412 filed Sep. 3, 2003;
U.S. patent application Ser. No. 10/681,861 filed Oct. 8, 2003;
U.S. patent application Ser. No. 10/721,658 filed Nov. 25, 2003;
U.S. patent application Ser. No. 10/689,309 filed Oct. 20, 2003, which issued as U.S. Pat. No. 6,978,453 on Dec. 20, 2005;
PCT Application No. PCT/US03/33241 filed Oct. 20, 2003; and
U.S. patent application Ser. No. 11/251,046 filed Oct. 14, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and/or application software that may be either provided by the manufacturers of the electronic devices, telecommunication carriers, or third parties. Firmware and/or application software often may contain software bugs. New versions of the firmware and software are periodically released to fix the bugs, introduce new features, or both. There is a fundamental problem in providing access to new releases of firmware and software. The electronic devices are often constrained in terms of resources, such as available memory. Attempts to upgrade firmware or software by end-users often results in making the device, or some features of the device, inoperable.

Changing firmware in electronic devices requires a lot of caution and care as unsuccessful attempts may result in making the device inoperable. Generating update packages used in changing firmware in electronic devices involves applying the generated update packages in electronic devices that are often constrained in several different ways. Attempts to upgrade firmware and/or software in constrained devices are often hampered by limited user interaction capabilities and slow communication speeds on these devices. Additionally, determination of the version of firmware or software currently being executed on the electronic device may be difficult, especially if such determination is made with minimal end-user interaction.

The manufacturing time of electronic devices with firmware/software is affected by the time it takes to install firmware and/or application software in non-volatile memory, such as FLASH memory. If the size of the firmware and/or application software is large, fewer electronic devices can be flashed with an upgrade within a given period of time. Increasingly, the number of electronic devices that can be flashed (with firmware and/or application software) within a given period of assembly/manufacturing time is requiring innovative solutions to the flashing problem.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a method for optimizing distribution of information. The method may comprise generating update information based upon at least one universal dictionary and communicating the update information to a remote device. The update package may enable use by the remote device of the at least one universal dictionary. The method may also comprise communicating a reduced amount of data to the remote device based upon the at least one universal dictionary.

In another embodiment of the present invention, the at least one universal dictionary may comprise a first universal dictionary employed by the sender and a second universal dictionary employed by the receiver.

In another embodiment of the present invention, the universal dictionary employed by the sender and the universal dictionary employed by the receiver may comprise substantially identical information.

In another embodiment of the present invention, the at least one universal dictionary may comprise a universal dictionary shared by the sender and the receiver.

In another embodiment of the present invention, the method may further comprise regenerating original data from an update package received from the sender using the universal dictionary.

In another embodiment of the present invention, the method may further comprise comparing information contained in at least a pair of binary images, deriving difference information from the compared information, creating an update package comprising the derived difference information, sending the update package to a universal dictionary accessible by the receiver, and updating the universal dictionary accessible by the receiver with the update package.

In another embodiment of the present invention, the derived difference information may at least comprise a set of instructions and associated data.

In another embodiment of the present invention, the set of instructions may comprise at least one program instruction selected from: copy; duplicate; set; reference location call; and delete.

In another embodiment of the present invention, the method may further comprise generating a plurality of update packages, analyzing the update packages to determine differences in at least two universal dictionaries, communicating difference information to the at least two universal dictionaries, and synchronizing the at least two universal dictionaries.

In another embodiment of the present invention, the method may further comprise comparing random data associated with a plurality of information packages to be transmitted, compressing the random data based upon contents of the plurality of information packages, sharing the compressed random data with a plurality of sender/receiver pairs, and synchronizing the at least one universal dictionary associated with the sender/receiver pairs based upon the compressed random data.

Aspects of the present invention may be found in a method for optimizing distribution of information between an electronic device and a server. The method may comprise accessing at least one universal dictionary by the electronic device and the server, generating at least one optimized photo information package from a new photo acquired by the electronic device using a reference frame of photos, communicating the at least one optimized photo information package from the electronic device to the server, receiving the at least one optimized photo information package at the server, regenerating the new photo from the at least one optimized photo information package, and storing the regenerated new photo in a storage.

In another embodiment of the present invention, generating at least one optimized photo information package may further comprise generating at least one update package in the electronic device. The at least one update package may comprise optimized photo information. The method may also comprise communicating the at least one update package from the electronic device to the server, processing the at least one update package, regenerating a copy of the new photo based upon information in the at least one update package.

In another embodiment of the present invention, generating at least one optimized photo information package may further comprise generating a plurality of update packages. Each update package may contain photo information comprising an initial quantity of memory. The method may also comprise transferring at least one of the plurality of update packages to at least one processing device, processing the at least one update package by compressing the photo information contained in the at least one update package such that the photo information occupies a reduced quantity of memory, transferring the at least one update package to the photo server, regenerating at least one photo using the compressed photo information in the at least one update package, and storing the at least one regenerated photo. The at least one regenerated photo may occupy less memory than the initial quantity of memory.

Aspects of the present invention may be found in a system for optimizing distribution of information. The system may comprise a first electronic device capable of at least generating and sending digital information, a second electronic device capable of at least receiving, regenerating and storing digital information. The first and second electronic devices employing at least one universal dictionary may at least store, retrieve and manage digital information.

In another embodiment of the present invention, the first electronic device may comprise a digital camera.

In another embodiment of the present invention, the digital camera may at least comprise image acquisition circuitry for acquiring digital photographic information, a communication agent for communicating with external devices, a generator for generating an update package to be communicated to the receiver, a reference frame of photos, and previously acquired digital photographic information.

In another embodiment of the present invention, the generator may process the previously acquired digital photographic information by comparing the previously acquired digital photographic information to the reference frame of photos and generating an update package to be communicated to the receiver comprising information from the reference frame and the previously acquired digital photographic information.

In another embodiment of the present invention, the reference frame of photos may at least comprise additional previously acquired digital photographic information and digital photographic information corresponding to a particular digital camera.

In another embodiment of the present invention, the second electronic device may comprise a photo server.

In another embodiment of the present invention, the photo server may at least comprise a communication agent for at least receiving digital photographic information from the first electronic device, an update agent for at least generating a local copy of previously acquired digital photographic information received from the first electronic device, a processor for processing digital photographic information, and memory for storing digital photographic information.

In another embodiment of the present invention, the photo server may further comprise a plurality of reference frames of photos, each reference frame corresponding to at least one particular first electronic device.

In another embodiment of the present invention, the at least one universal dictionary may further comprise a first universal dictionary employed by the first electronic device and a second universal dictionary employed by the second electronic device.

In another embodiment of the present invention, the first universal dictionary and the second universal dictionary may comprise substantially identical information.

In another embodiment of the present invention, the at least one universal dictionary may be shared by the first and second electronic devices.

In another embodiment of the present invention, the system may further comprise a flash image server to provide optimized digital information to a flash memory when an electronic device may be initially flashed with a memory image.

In another embodiment of the present invention, the system may further comprise a flash manager to initialize an electronic device a first time the electronic device is flashed.

In another embodiment of the present invention, the system may further comprise a flash update driver employed by the flash manager to embed a new image onto the flash memory which may be employed by a processing circuitry operating the electronic device.

These and various other advantages and features of novelty which may characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE DRAWINGS

Figure 1:
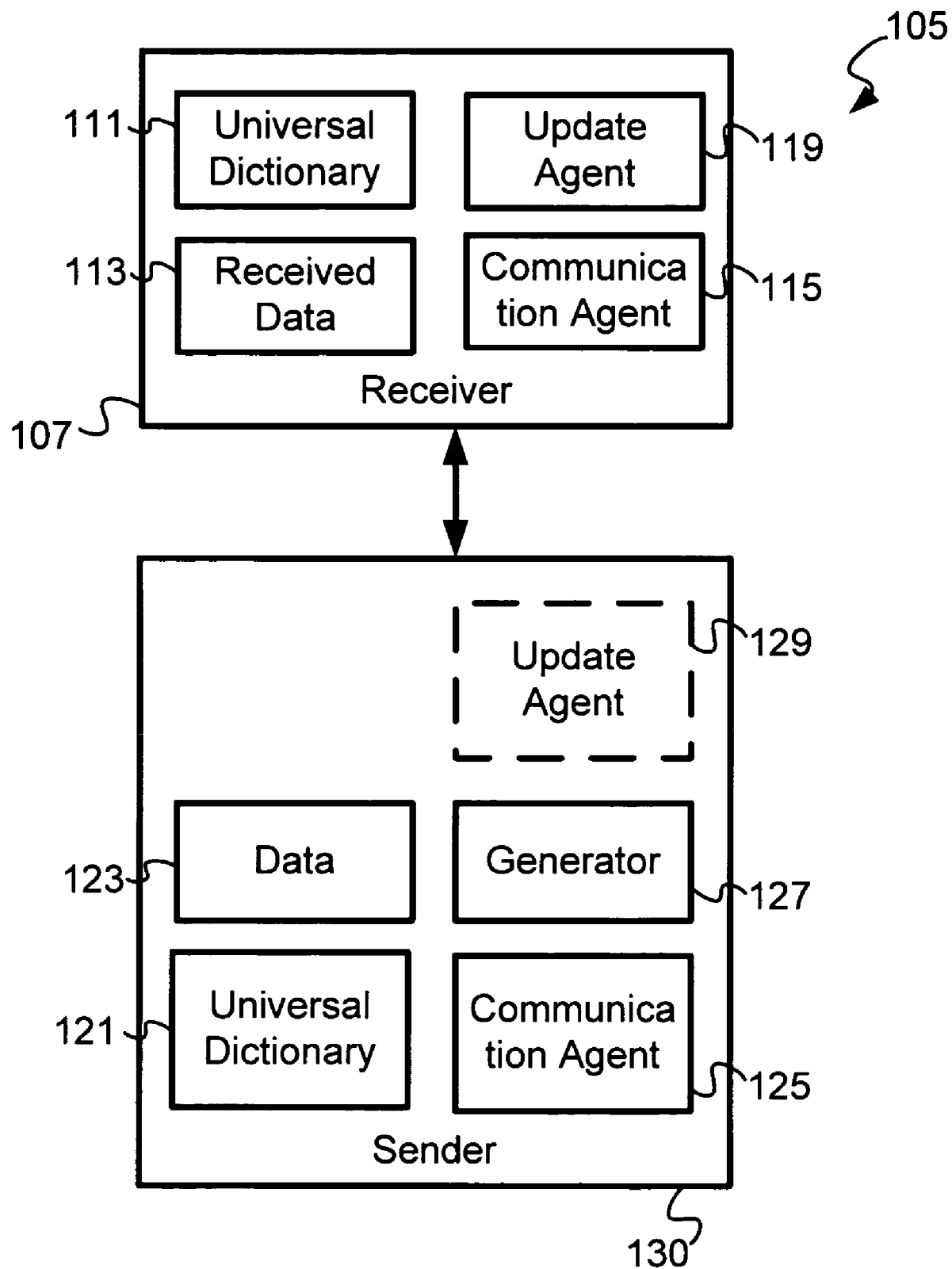
FIG. 1 is a block diagram of a system which may be adapted for optimizing distribution of information employing a universal dictionary that may facilitate a reduction of data communicated between a sender and a receiver employing the universal dictionary, according to an embodiment of the present invention.

FIG. 1 is a block diagram of a system which may be adapted for optimizing distribution of information employing universal dictionary 105 that may facilitate reduction of data communicated between sender 130 and receiver 107 employing universal dictionary 111, 121 according to an embodiment of the present invention. The universal dictionary 111, 121 may be a frame of reference available to sender 130 as well as receiver 107, deviation from which constitutes data that may be communicated to the other party (sender 130 or receiver 107).

Sender 130 may comprise universal dictionary 121, data 123 that may be communicated to receiver 107 as an update package, communication agent 125 that may facilitate communication with receiver 107, generator 127 that may be employed to generate an update package from data 123 based on universal dictionary 121, and update agent 129.

Receiver 107 may comprise universal dictionary 111, received data 113 that may be communicated to receiver 107 by sender 130 as an update package, communication agent 115 that may facilitate communication with sender 130, and update agent 119 that may be employed to regenerate original data from the update package received from sender 130 with the aid of universal dictionary 111.

In an embodiment of the present invention, both sender 130 and receiver 107 may employ the same universal dictionary 121, 111, respectively. In another embodiment of the present invention, sender 130 and receiver 107 may have similar, but different, universal dictionaries with a significant portion common to both universal dictionaries 121, 111.

A system for optimizing distribution of information employing universal dictionary 105 may facilitate generation of compact and efficient update packages based upon data 123 and universal dictionary 121 such that the size of the update packages may be significantly smaller compared to the size of data 123. The system may also facilitate communication of generated update packages from sender 130 to receiver 107 and subsequent regeneration of data 123 in receiver 107 employing received data 113 (update package and other related information) and universal dictionary 111. The regenerated data may then be used in receiver 107.

In an embodiment of the present invention, data 123 and regenerated data in receiver 107 may actually be binary images of firmware and/or application software being executed in receiver 107. Sender 130 may communicate data to other senders that may also contain universal dictionary 121 and update agent 129.

A system for optimizing distribution of information employing universal dictionary 105 may typically be employed to optimize distribution of certain classes of information wherein the universal dictionary may provide a common set of information/data/content on both the sending and receiving sides, thus enabling reduction of the size of information/data/content that may be communicated from the sending side to the receiving side.

In an embodiment of the present invention, the system for optimizing distribution of information employing universal dictionary 105 may be used to improve downloading of very large files, such as MPEG files, wherein an MPEG based universal dictionary may be employed in both the sender and the receiver.

In an embodiment of the present invention, the system for optimizing distribution of information employing universal dictionary 105 may be used in creating a frame of reference (i.e., reference frame) so that other binary images may be compared to derive difference information (update package). Because both sender 130 and receiver 107 may have the same reference frame (as universal dictionary 111, 121), the size of update package communicated by sender to receiver may be reduced when the reference frame is employed.

In an embodiment of the present invention, wherein both sender 130 and receiver 107 may have the same (or similar) firmware and wherein a frame of reference may not be available, firmware on sender 130 may be used as the reference frame to generate difference information (or update package) from data 123, difference information that may be subsequently communicated to receiver 107. Receiver 107 may have the same firmware as sender 130, or may have access to a copy of firmware of sender 130, and may employ firmware to generate data 123 from the difference information (or update package) received.

In an embodiment of the present invention, generator 127 may generate an update package that may capture differences between any given two versions of application software and/or firmware. The differences may be expressed by employing a set of instructions and associated data. The set of instructions may comprise a CPY (copy), DUP (duplicate), SET (set), SETR (reference location call), DEL (delete), and/or other instructions. Universal dictionaries 121, 111 may be generated in terms of data employed in a set of instructions (and associated data) retrieved from several instances of update packages.

In an embodiment of the present invention, generator 127 may analyze several update packages to determine the nature of universal dictionaries 121, 111. Specifically, the generator may analyze the DUP instructions, CPY instructions, etc. from several update packages to assemble universal dictionaries 121, 111. Changes to universal dictionary 121 may be communicated to universal dictionary 111 to keep the dictionaries synchronized.

In general, a system for optimizing distribution of information employing universal dictionary 105 may employ a default frame of reference (universal dictionary) for comparing and compressing random data (such as photographs). The default frame of reference may be available on both client and server side, between two peers, or between sender/receiver pairs.

Figure 2:
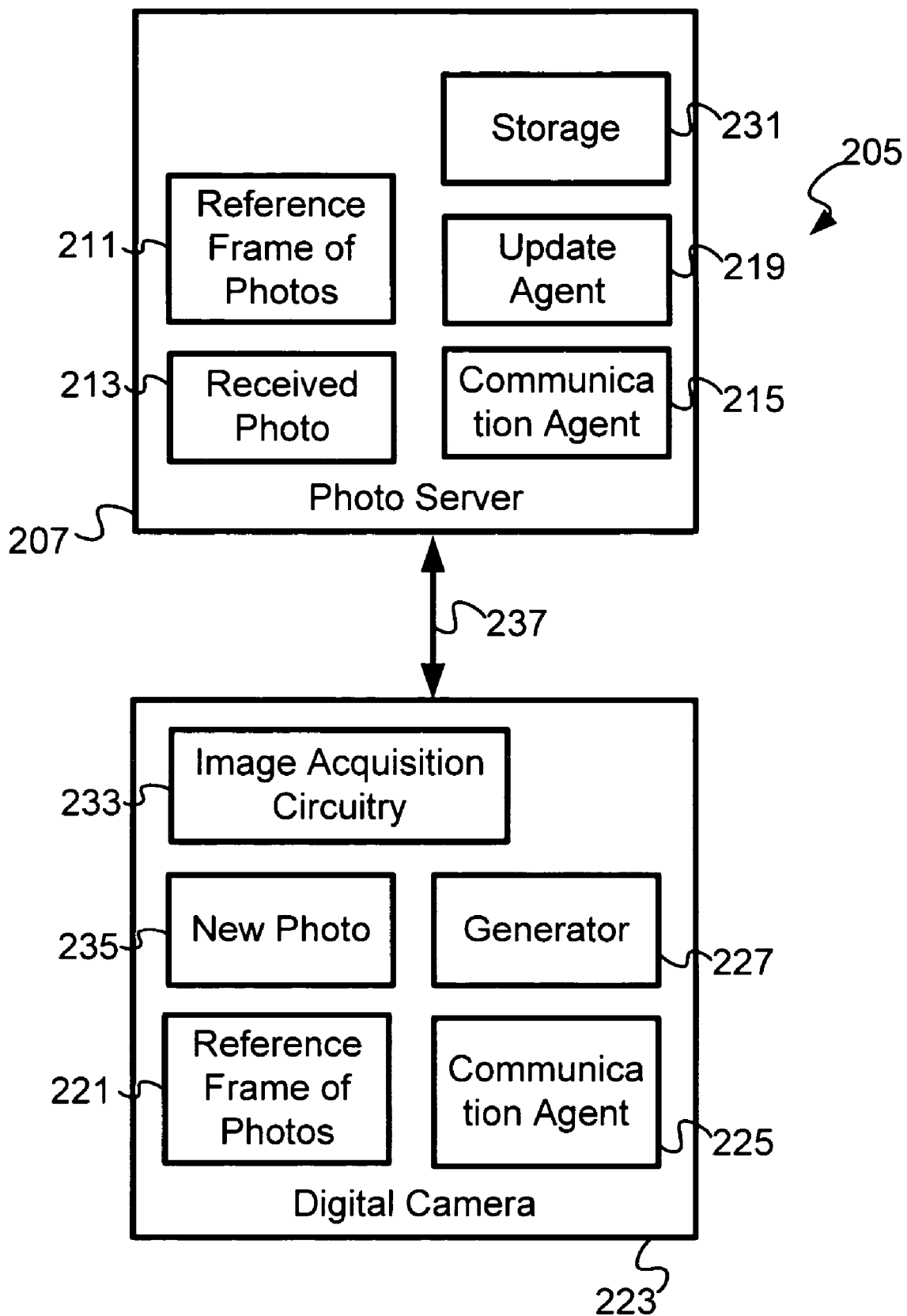
FIG. 2 is a block diagram of a system for optimizing distribution of information employing a universal dictionary wherein the sender may be a digital camera capable of generating an optimized photo using a reference frame of photos from a new photo taken by the digital camera, and the receiver may be a photo server capable of receiving an optimized photo and regenerating the new photo from the optimized photo using an update agent, and storing the new photo in a storage, according to an embodiment of the present invention.

FIG. 2 is a block diagram of a system for optimizing distribution of information employing universal dictionary 205 wherein the sender may be digital camera 223 capable of generating an optimized photo, using reference frame of photos 221, from new photo 235 taken by digital camera 223, and the receiver may be photo server 207 capable of receiving an optimized photo, regenerating new photo 235 from the optimized photo using update agent 219, and storing the new photo in storage 231, according to an embodiment of the present invention. Photo server 207 in the system for optimizing distribution of information employing universal dictionary 205 may be used to store, retrieve, and manage a plurality of photos that may be created and communicated by digital camera 223. Digital camera 223 may be communicatively coupled to photo server 207 employing one of several communication links 237.

Digital camera 223 may comprise image acquisition circuitry 233, communication agent 225, generator 227, reference frame of photos 221, and new photo 235. Photo server 207 may comprise update agent 219, communication agent 215, storage 231, reference frame of photos 211, and received photo 213.

In an embodiment of the present invention, when digital camera 223 is used to generate new photo 235, generator 227 in digital camera 223 may automatically process new photo 235, compare it to reference frame of photos 221, and generate an update package that may be communicated over communication links 237 to photo server 207 as received photo 213. Photo server 207 may process received photo 213 and employ update agent 219 to generate a local copy of new photo 235 from received photo 213. Photo server 207 may save a copy of new photo 235 in storage 231 for subsequent processing and/or subsequent access. Update agent 219 may employ reference frame of photos 211 to generate the copy of new photo 235 from received photo 213.

In an embodiment of the present invention, reference frame of photos 221 may initially be loaded onto a digital camera by communication agent 225 after retrieving reference frame of photos 211 from photo server 207. Photo server 207 may employ a different reference frame of photos 211 for each digital camera 223.

Figure 3:
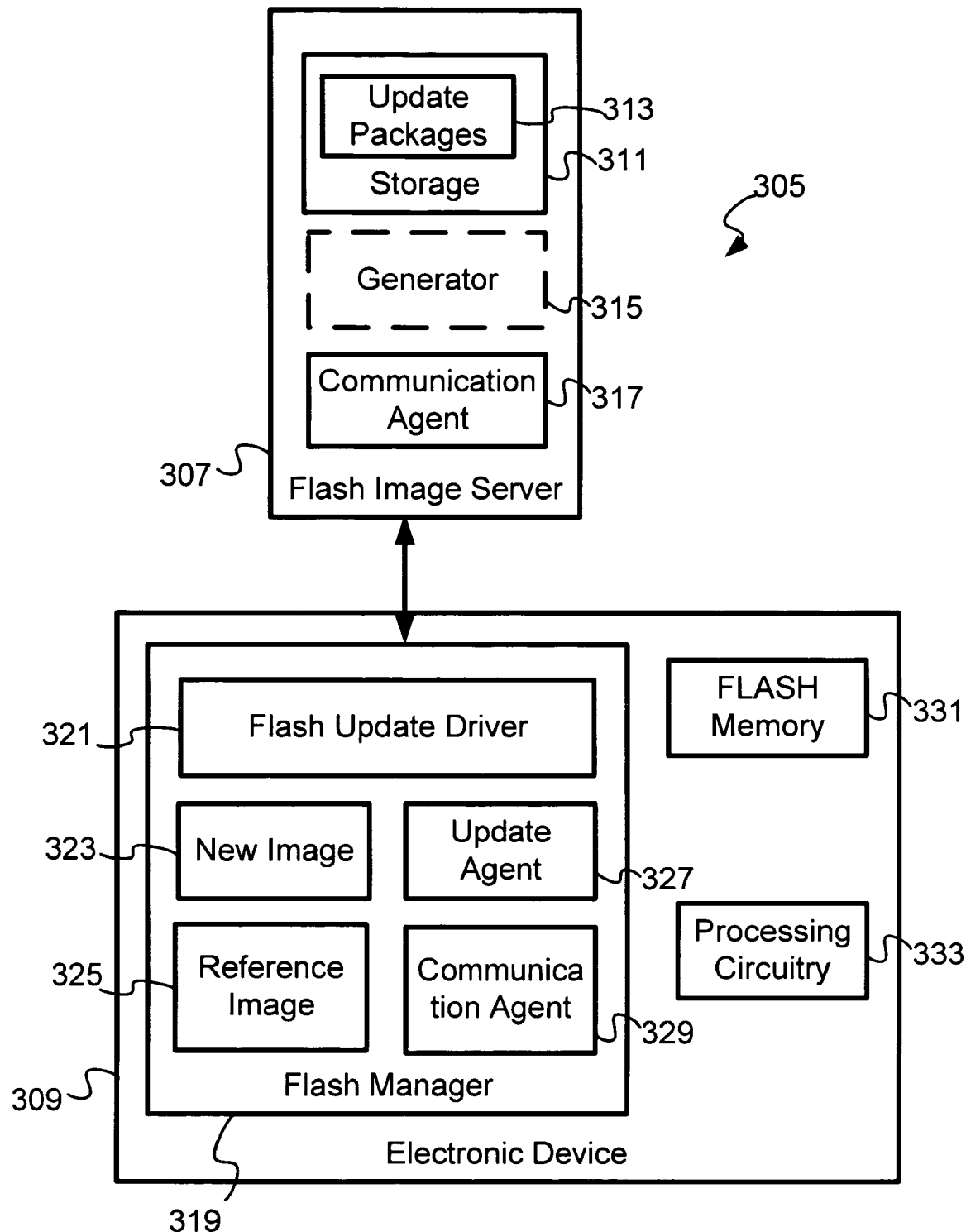
FIG. 3 is a block diagram of a system for optimizing distribution of information employing a universal dictionary that may comprise a flash image server that may supply optimized information that may be processed employing the universal dictionary and an electronic device that may be used to provide optimized information to update a FLASH memory when an electronics device is initially to be flashed with a memory image, according to an embodiment of the present invention.

FIG. 3 is a block diagram of a system for optimizing distribution of information employing a universal dictionary 305 that may comprise a flash image server 307 that may supply optimized information that may be processed employing a universal dictionary and electronic device 309 that may be used to provide optimized information to update FLASH memory 331 when electronics device 309 may initially be flashed with a memory image, according to an embodiment of the present invention.

In an embodiment of the present invention, flash image server 307 may rely upon availability of flash manager 319 in electronic device 309 to initialize electronic device 309 a first time, such as in an assembly line at a manufacturing facility. Flash manager 319 may receive an optimized image as an update package from flash image server 307 and may employ update agent 327 to create new image 323, which may typically be a binary image of the firmware and/or application software that may be embedded in FLASH memory 331. Update agent 327 may employ reference image 325 to create new image 323. Flash update driver 321 may be employed by flash manager 309 to embed new image 323 onto FLASH memory 331. FLASH memory 331 that may be employed by processing circuitry 333 to operate electronic device 309.

In an embodiment of the present invention, flash manager 319 may initiate communication with flash image server 307 when flash manager 319 determines that at least a small portion of FLASH memory 331 is to be updated. Flash image server 307 may determine parameters and/or particulars of electronic device 309 and may identify an update package from storage 311 that contains a plurality of update packages 313. Flash image server 307 may then transfer an appropriate one of the plurality of update packages 313 to electronic device 309 via communication agents 317, 329. Electronic device 309 may process the received update package, verify the update package, and employ update agent 327 to generate new image 323 based on reference image 325. Electronic device 309 may subsequently apply new image 323 to FLASH memory 331 employing flash update driver 321 and/or processing circuitry 333.

In an embodiment of the present invention, use of a reference image by flash manager 319 to create new image 323 reduces the size of the update package transferred from flash image server 307, reducing the time to transfer the update package, and also reducing the time to update FLASH memory 331.

In an embodiment of the present invention, reference image 325 may be stored in FLASH memory 331 and received update packages may be processed by update agent 327 to create a new image in FLASH memory 331 based on existing reference image 325 in FLASH memory 331. Because reference image 325 may already be part of FLASH memory 331, update agent 327 may modify all or only a subset of the contents of reference image 325 to make the new image in FLASH memory 331 such that new image 323 in FLASH memory 331 may correspond to a new version of firmware and/or application software, as needed. In short, changes may be made to the reference image 325 in FLASH memory 331 to make the reference image into new image 323. Because the amount of FLASH memory modified/updated is generally smaller than would have been required if reference image 325 were not in FLASH memory 331, the update of electronic device 309 is faster. As such, when employed in a manufacturing environment where electronic device 309 is manufactured and reference image 325 may already be installed in FLASH memory 331. The time taken to install additional firmware and/or application software is generally reduced in each electronic device in an assembly line.

In an embodiment of the present invention, electronic device 309 may be a cellular phone and flash image server 307 may be employed in a manufacturing facility where electronic device 309 is manufactured along with other instances of similar electronic devices. Reference image 325 may be embedded in FLASH memory 331, wherein reference image 325 may be a collection of firmware and/or application software components that may be common to a plurality of manufacturers for a similar hardware setup/configuration. Common application software components may be those that are typically found in firmware and/or application software for such electronic devices provided by different manufacturers using the same (or similar) FLASH memory 331, and the same (or similar) processing circuitry 333, etc.

Figures 4A, 4B:
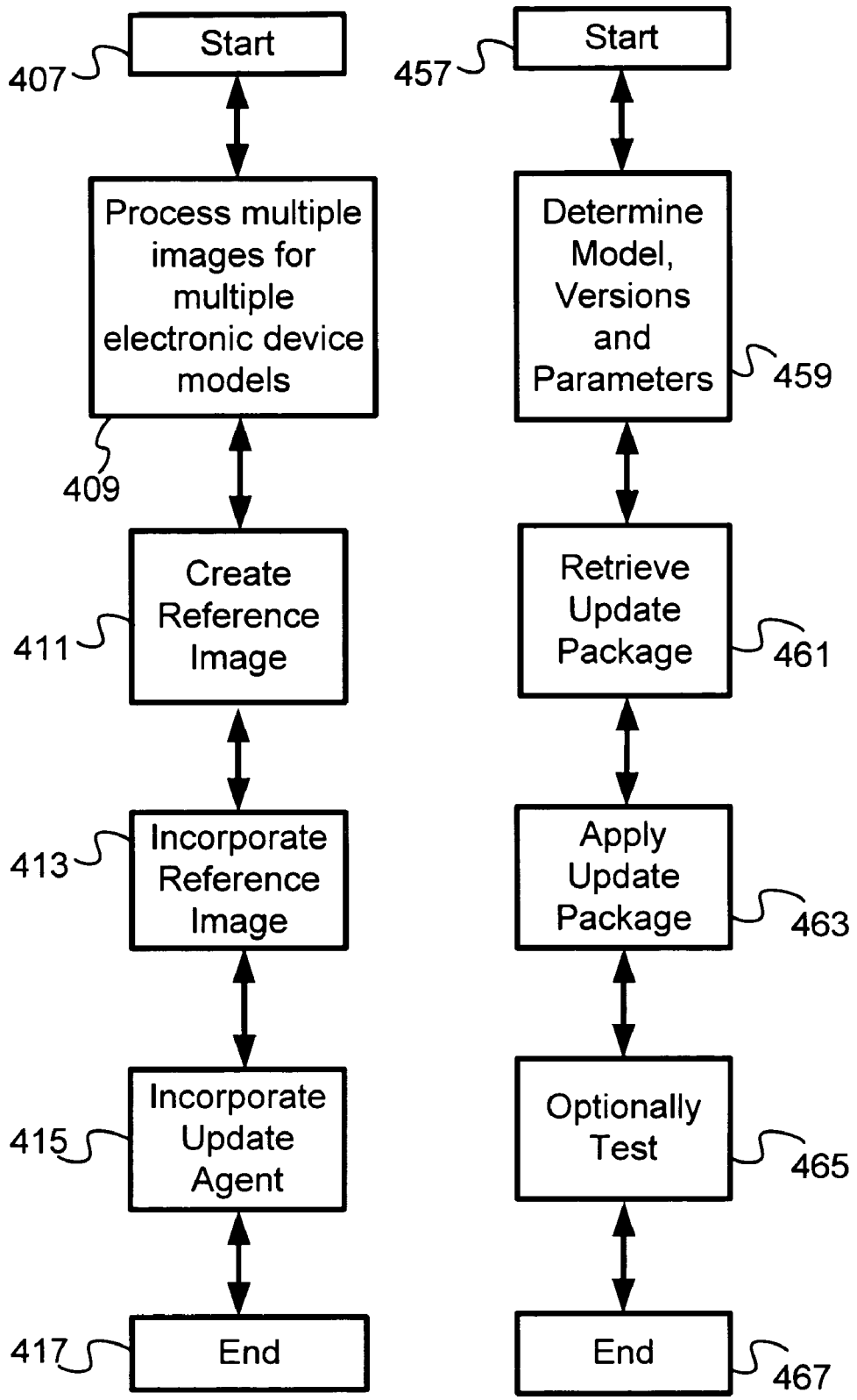
FIG. 4A is a flow diagram depicting an exemplary process of readying an electronic device for arming with a flash manager capable of employing a reference image for updating firmware and/or application software, according to an embodiment of the present invention.
FIG. 4B is a flow diagram depicting an exemplary process of retrieving an update package from an electronic device armed with a flash manager and capable of employing a reference image for updating firmware and/or application software, according to an embodiment of the present invention.

FIG. 4A is a flow diagram depicting an exemplary process of readying an electronic device for arming with a flash manager capable of employing a reference image for updating firmware and/or application software, according to an embodiment of the present invention. The process may also address creation of a reference image incorporating binary image segments from a plurality of electronic device models. The reference image may be capable of being installed in electronic devices for subsequent creation of binary images by an update agent in the electronic device.

Processing begins at block 407 wherein the hardware specification of an electronic device may be determined and access to binary memory images of firmware and/or application software for the electronic device (and optionally for other similar devices) may be retrieved. At block 409, one or more binary images of firmware and/or application software for the electronic device (typically based on the processing circuitry, FLASH memory type, etc.) may be processed and portions of code/image (typically in binary) determined to be common to one or more binary images of firmware and/or application software may be identified for incorporation into a reference image.

At block 411, the reference image may be created and packaged for inclusion into an electronic device. At block 413, the reference image may be incorporated into the reference image component of the flash manager of the electronic device. At block 415, an update agent capable of employing the reference image may be incorporated into the FLASH manager. At block 417, the flash manager of the electronic device is ready and may be installed in the electronic device.

FIG. 4B is a flow diagram depicting an exemplary process of retrieving an update package from an electronic device armed with a flash manager and capable of employing a reference image for updating firmware and/or application software according to an embodiment of the present invention.

Processing may begin at block 457 when the electronic device with the FLASH manager in FLASH memory (or other non-volatile memory) may be plugged into an assembly line at a manufacturing facility with a communication link enabling an update package to be transferred to the electronic device. The electronic device may be communicatively coupled to the flash server, such as the flash image server 302 of FIG. 3.

At block 459, model and version information, and other parameters may be communicated by the electronic device to the flash server. At block 461, an update package may be retrieved by the electronic device from the flash server. At block 463, the electronic device may apply the update package. The application of the update package by the update agent in the electronic device may assume that the reference image be previously embedded in non-volatile memory of the electronic device, such as FLASH memory.

In an embodiment of the present invention, the reference image which may be derived from firmware and/or application software binary images may be located in FLASH memory of the electronic device and may have a communication agent and update agent associated therewith in executable portions of non-volatile/volatile memory. Application of an update package may cause the FLASH memory of the electronic device to be modified such that its firmware and/or application software matches a specific manufacturer firmware and/or application software setup for the hardware configuration available. At block 465, newly created or implemented firmware/software in the electronic device may be tested. Processing ceases at block 467.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. A method for optimizing distribution of information, the method comprising:
generating update information representing at least one universal dictionary;
communicating the update information to a first electronic device and to a second electronic device, the update information for use by the first electronic device and the second electronic device to maintain a local copy of the at least one universal dictionary as a common frame of reference for communication of data;
communicating a reduced amount of data from the first electronic device to the second electronic device using content of the at least one universal dictionary, wherein the reduced amount of data is expressed as a set of instructions;
generating plurality of update packages;
analyzing the update packages to determine differences in at least two universal dictionaries;
communicating difference information to the at least two universal dictionaries; and
synchronizing the at least two universal dictionaries.

2. The method according to claim 1, wherein the at least one universal dictionary comprises a universal dictionary employed by the first electronic device and another universal dictionary employed by the second electronic device.

3. The method according to claim 2, wherein the universal dictionary employed by the first electronic device and the universal dictionary employed by the second electronic device comprise substantially identical information.

4. The method according to claim 1, wherein the at least one universal dictionary comprises a universal dictionary shared by the first electronic device and the second electronic device.

5. The method according to claim 1, comprising regenerating original data from an update package received by the second electronic device from the first electronic device by using the at least one universal dictionary.

6. The method according to claim 1, comprising:
comparing information contained in at least a pair of binary images;
deriving difference information from the compared information;
creating an update package comprising the derived difference information;
sending the update package to a universal dictionary accessible by the second electronic device; and
updating the universal dictionary accessible by the second electronic device with the update package.

7. The method according to claim 6, wherein the derived difference information at least comprises a set of instructions and associated data.

8. The method according to claim 7, wherein the set of instructions comprises at least one program instruction selected from: copy; duplicate; set; reference location call; and delete.

9. The method according to claim 1, comprising:
comparing random data associated with a plurality of information packages to be transmitted;
compressing the random data based upon contents of the plurality of information packages;
sharing the compressed random data with a plurality of sender/receiver pairs; and
synchronizing the at least one universal dictionary associated with a sender/receiver pair based upon the compressed random data.

10. The method according to claim 1, wherein the update information comprises an update package.

11. A system for optimizing distribution of information, the system comprising:
one or more processors communicatively coupled to a plurality of electronic devices, the one or more processors operating to, at least:
generate update information representing at least one universal dictionary;
communicate the update information to a first electronic device and to a second electronic device, the update information for use by the first electronic device and the second electronic device to maintain a local copy of the at least one universal dictionary as a common frame of reference for communication of data;
communicate a reduced amount of data from the first electronic device to the second electronic device using content of the at least one universal dictionary, wherein the reduced amount of data is expressed as a set of instructions;
generate a plurality of update packages;
analyze the update packages to determine differences in at least two universal dictionaries;
communicate difference information to the at least two universal dictionaries; and
synchronize the at least two universal dictionaries.

12. The system according to claim 11, wherein the at least one universal dictionary comprises a universal dictionary employed by the first electronic device and another universal dictionary employed by the second electronic device.

13. The system according to claim 12, wherein the universal dictionary employed by the first electronic device and the universal dictionary employed by the second electronic device comprise substantially identical information.

14. The system according to claim 11, wherein the at least one universal dictionary comprises a universal dictionary shared by the first electronic device and the second electronic device.

15. The system according to claim 11, comprising regenerating original data from an update package received by the second electronic device from the first electronic device by using the at least one universal dictionary.

16. The system according to claim 11, comprising:
comparing information contained in at least a pair of binary images;
deriving difference information from the compared information;
creating an update package comprising the derived difference information;
sending the update package to a universal dictionary accessible by the second electronic device; and
updating the universal dictionary accessible by the second electronic device with the update package.

17. The system according to claim 16, wherein the derived difference information at least comprises a set of instructions and associated data.

18. The system according to claim 17, wherein the set of instructions comprises at least one program instruction selected from: copy; duplicate; set; reference location call; and delete.

19. The system according to claim 11, comprising:
comparing random data associated with a plurality of information packages to be transmitted;
compressing the random data based upon contents of the plurality of information packages;
sharing the compressed random data with a plurality of sender/receiver pairs; and
synchronizing the at least one universal dictionary associated with a sender/receiver pair based upon the compressed random data.

20. The system according to claim 11, wherein the update information comprises an update package.

21. A computer-readable storage media having stored thereon, a computer program having at least one code section for optimizing distribution of information, the at least one code section executable by a computer to perform steps comprising:
generating update information representing at least one universal dictionary;
communicating the update information to a first electronic device and to a second electronic device, the update information for use by the first electronic device and the second electronic device to maintain a local copy of the at least one universal dictionary as a common frame of reference for communication of data;
communicating a reduced amount of data from the first electronic device to the second electronic device using content of the at least one universal dictionary, wherein the reduced amount of data is expressed as a set of instructions;
generating a plurality of update packages;
analyzing the update packages to determine differences in at least two universal dictionaries;
communicating difference information to the at least two universal dictionaries; and
synchronizing the at least two universal dictionaries.

22. The computer-readable storage media according to claim 21, wherein the at least one universal dictionary comprises a universal dictionary employed by the first electronic device and another universal dictionary employed by the second electronic device.

23. The computer-readable storage media according to claim 22, wherein the universal dictionary employed by the first electronic device and the universal dictionary employed by the second electronic device comprise substantially identical information.

24. The computer-readable storage media according to claim 21, comprising code for regenerating original data from an update package received by the second electronic device from the first electronic device by using the at least one universal dictionary.

25. The computer-readable storage media according to claim 21, comprising code for:
comparing information contained in at least a pair of binary images;
deriving difference information from the compared information;
creating an update package comprising the derived difference information;

sending the update package to a universal dictionary accessible by the second electronic device; and updating the universal dictionary accessible by the second electronic device with the update package.

26. The computer-readable storage media according to claim 25, wherein the derived difference information at least comprises a set of instructions and associated data.

27. The computer-readable storage media according to claim 26, wherein the set of instructions comprises at least one program instruction selected from: copy; duplicate; set; reference location call; and delete.

28. The computer-readable storage media according to claim 21, comprising code for:

comparing random data associated with a plurality of information packages to be transmitted;

compressing the random data based upon contents of the plurality of information packages;

sharing the compressed random data with a plurality of sender/receiver pairs; and synchronizing the at least one universal dictionary associated with a sender/receiver pair based upon the compressed random data.

* * * * *

UNITED STATES PATENT AND TRADEMARK OFFICE
CERTIFICATE OF CORRECTION

PATENT NO. : 7,461,372 B2 Page 1 of 1
APPLICATION NO. : 10/681861
DATED : December 2, 2008
INVENTOR(S) : Patrick C. Lilley It is certified that error appears in the above-identified patent and that said Letters Patent is hereby corrected as shown below:

In column 10, line 31, in Claim 1, after "generating" insert -- a --.

Signed and Sealed this

Second Day of June, 2009

JOHN DOLL
*Acting Director of the United States Patent and Trademark Office*